United States Patent
Nakayama et al.

(10) Patent No.: US 6,768,049 B2
(45) Date of Patent: *Jul. 27, 2004

(54) THERMOPHOTOVOLTAIC ELECTRIC POWER GENERATING APPARATUS AND POWER GENERATING METHOD THEREOF

(75) Inventors: Hideki Nakayama, Susono (JP); Yoshio Kimura, Okazaki (JP); Kiyohito Murata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/114,468

(22) Filed: Apr. 3, 2002

(65) Prior Publication Data

US 2002/0148498 A1 Oct. 17, 2002

(30) Foreign Application Priority Data

Apr. 13, 2001 (JP) .................................. P. 2001-115489

(51) Int. Cl.$^7$ ............................................. H01L 31/058
(52) U.S. Cl. .................. 136/253; 250/493.1; 431/115; 60/641.8; 432/182
(58) Field of Search ...................... 136/253; 250/493.1; 431/115; 432/182; 60/641.8

(56) References Cited

U.S. PATENT DOCUMENTS

| | | | | | |
|---|---|---|---|---|---|
| 4,707,560 | A | * | 11/1987 | Hottel et al. | 136/253 |
| 5,383,976 | A | * | 1/1995 | Fraas et al. | 136/253 |
| 5,439,532 | A | * | 8/1995 | Fraas | 136/253 |
| 5,512,109 | A | * | 4/1996 | Fraas et al. | 136/253 |
| 5,551,992 | A | * | 9/1996 | Fraas | 136/253 |
| 5,932,885 | A | * | 8/1999 | DeBellis et al. | 250/493.1 |
| 6,204,442 | B1 | * | 3/2001 | Laqua | 136/253 |
| 6,686,534 | B2 | * | 2/2004 | Chen | 136/253 |
| 2002/0153035 | A1 | * | 10/2002 | Nakayama et al. | 136/206 |
| 2003/0066290 | A1 | * | 4/2003 | Murata et al. | 60/698 |
| 2003/0230336 | A1 | * | 12/2003 | Malfa et al. | 136/253 |

FOREIGN PATENT DOCUMENTS

| | | |
|---|---|---|
| JP | 61-224369 | 10/1986 |
| JP | 63-316486 | 12/1988 |
| JP | 2-502692 | 8/1990 |
| JP | 2001-210852 | 8/2001 |

OTHER PUBLICATIONS

*Research and Development on Organization of Environment–Conscious High Efficiency Power Generator for Next Generation*, Engineering Advancement Association of Japan, 1997 Social Development System Planning Project Report, (Mar. 1998).

* cited by examiner

*Primary Examiner*—Alan Diamond
(74) *Attorney, Agent, or Firm*—Finnegan, Henderson, Farabow, Garrett & Dunner, L.L.P.

(57) ABSTRACT

A thermophotovoltaic power generating apparatus that heats an emitter by a combustion gas produced by fuel and air, and converts light radiated from the emitter into electric power by using photoelectric conversion elements. An air pipe is disposed in an internal hollow portion of the emitter, and a combustion gas supplier for supplying the combustion gas toward the emitter is disposed outside the emitter. The photoelectric conversion elements that receive radiated light are disposed further outside of the emitter. Therefore, residual heat of the combustion gas that has heated the emitter is utilized to heat the air needed for the combustion of fuel, and light radiated from the heated emitter is received by the photoelectric conversion elements. Thus, electric power generating efficiency can be improved.

18 Claims, 4 Drawing Sheets

THERMOPHOTOVOLTAIC ELECTRIC POWER GENERATING APPARATUS AND POWER GENERATING METHOD THEREOF

INCORPORATION BY REFERENCE

The disclosure of Japanese Patent Application No. 2001-115489 filed on Apr. 13, 2001, including the specification, drawings and abstract is incorporated herein by reference in its entirety.

BACKGROUND OF THE INVENTION

1. Field of the Invention

The invention relates to a thermophotovoltaic power generating apparatus (TPV system) and a power generating method thereof for generating electric power based on the thermophotovoltaic energy conversion of infrared light (also termed infrared ray, or heat ray) radiated from a heat source via a photoelectric conversion element (photoelectric conversion cell).

2. Description of the Related Art

Thermophotovoltaic power generating apparatuses cause an emitter to radiate infrared light of a constant wavelength by heating the emitter, and cause the infrared light to strike a photoelectric conversion element so that the infrared light is converted into electric power. The thermophotovoltaic power generating apparatus, having no movable portion, are able to realize noiseless and nonvibrating systems.

As a next-generation energy source, thermophotovoltaic power generation is excellent in terms of cleanliness, quietness, etc. Combustion heat, solar heat, atomic disintegration heat, etc. are available to heat the emitter of a thermophotovoltaic power generating apparatus. Typically employed for heating the emitter is a combustion gas that is produced by combustion of a fuel gas, such as butane and the like.

For example, it is known to use a thermophotovoltaic power generating apparatus that includes an emitter formed from a porous solid, emitter heating means designed so that combustion gas passes inside the emitter, and a photoelectric conversion element that converts energy radiated from the emitter into electric energy.

The combustion of a gas fuel using a gas burner, which needs air, is dependent on the air temperature. However, the air temperature is not considered at all in the conventional thermophotovoltaic power generating apparatuses.

Furthermore, the conventional thermophotovoltaic power generating apparatuses do not effectively utilize exhaust gas that has heated the emitter. If the exhaust gas is subjected to heat recovery using an external thermal converter, the apparatus size increases, and the power generation efficiency reduces.

Still further in conventional flat-shaped thermophotovoltaic power generating apparatuses, the emitter is heated starting at a lower portion or an upper portion of the emitter, and only energy radiated from one surface of the emitter is received by a cell so as to generate electric power. Therefore, the power generating efficiency is low. Thus, the thermophotovoltaic power generating apparatuses are susceptible to improvement in terms of attainment of high photoelectric conversion efficiency.

SUMMARY OF THE INVENTION

Accordingly, it is one object of the invention to provide a thermophotovoltaic power generating apparatus whose electric power generating efficiency is improved by effectively using residual heat of a combustion gas that has already heated an emitter to heat air needed for combustion of a fuel, and by efficiently receiving on a photoelectric conversion element light radiated from the efficiently heated emitter.

In order to achieve the aforementioned and other objects, the invention provides a thermophotovoltaic power generating apparatus including an emitter that is heated by a combustion gas produced by a fuel and air supplied, and a photoelectric conversion element that receives light radiated from the emitter, and converts the light into electric power, wherein the air needed for combustion is pre-heated by residual heat of the combustion gas that has heated the emitter.

There is also provided a power generating method of a thermophotovoltaic power generating apparatus in which a emitter is heated by a combustion gas produced by a fuel and air, and light radiated from the emitter is converted into electric power by a photoelectric conversion element. In this method, the combustion gas that has heated the emitter is led to a vicinity of the air, and the air is pre-heated through a heat exchange between the combustion gas and the air.

In the thermophotovoltaic power generating apparatus and the power generating method thereof, the air needed for the combustion is pre-heated by residual heat of the combustion gas that has heated the emitter, and the pre-heated air is used to burn fuel. Therefore, the temperature of the combustion gas increases, and the temperature of the emitter correspondingly increases. As a result, the radiation intensity increases, and the electric power generated by the photoelectric conversion element increases. That is, the efficiency in conversion from thermal energy into electric energy improves.

BRIEF DESCRIPTION OF THE DRAWINGS

The above mentioned and other objects, features, advantages, technical and industrial significance of this invention will be better understood by reading the following detailed description of preferred embodiments of the invention, when considered in connection with the accompanying drawings, in which.

DETAILED DESCRIPTION OF PREFERRED EMBODIMENTS

In the following description and the accompanying drawings, the present invention will be described in more detail with reference to exemplary, preferred embodiments.

Figure 1:
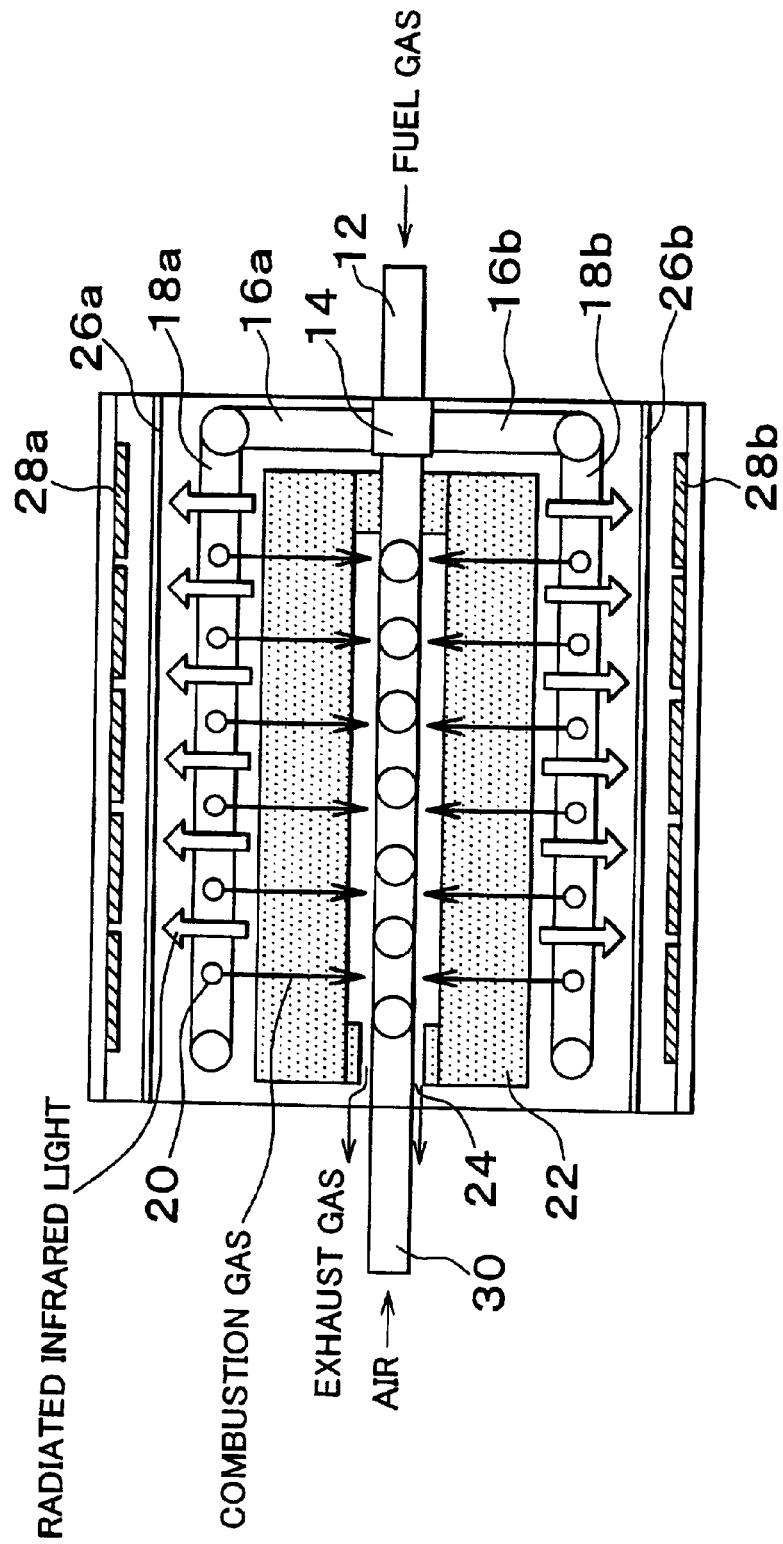
FIG. 1 is a schematic elevation with a partial sectional view of a thermophotovoltaic power generating apparatus in accordance with a first embodiment of the invention.
Figure 2:
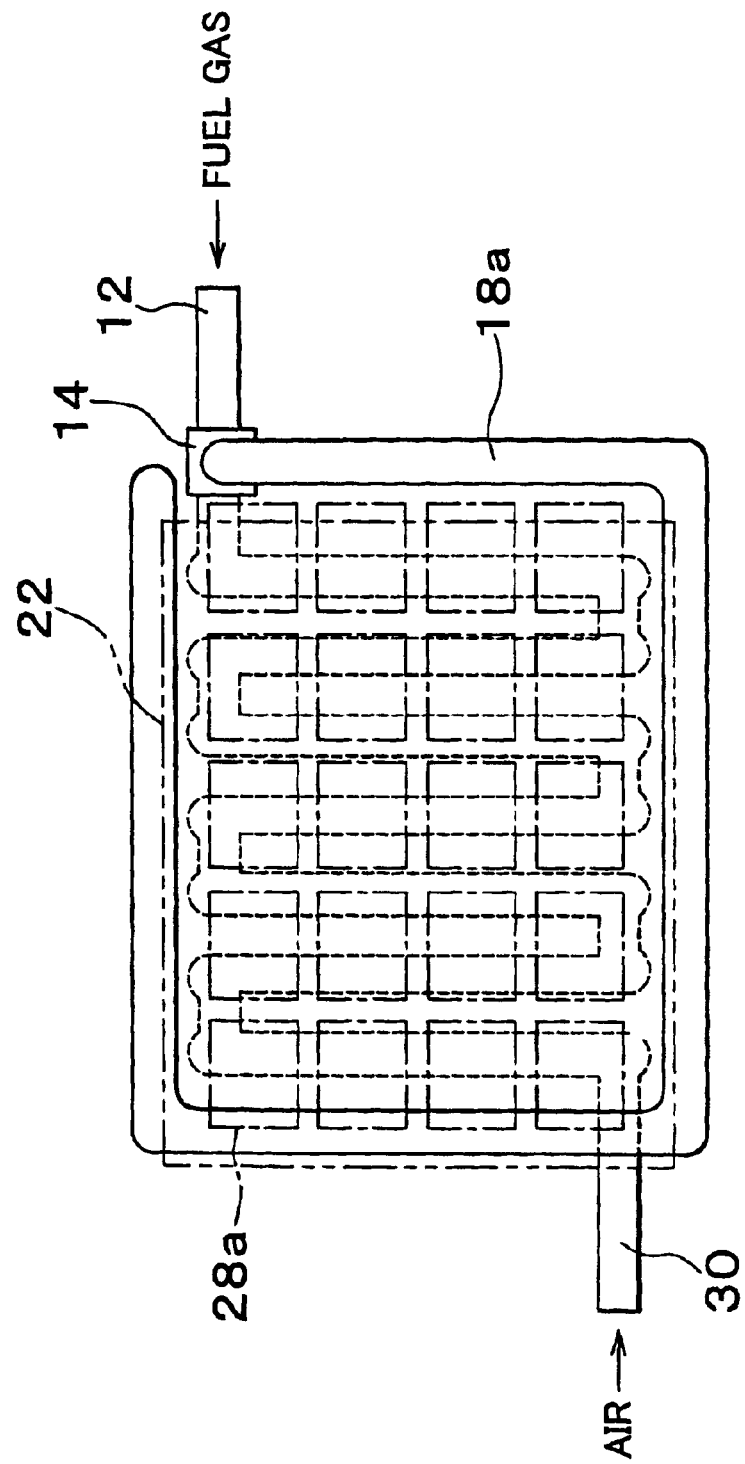
FIG. 2 is a schematic plan view with a partial sectional view of the thermophotovoltaic power generating apparatus in accordance with the first embodiment of the invention.

FIG. 1 is a schematic elevation with a partial sectional view of a thermophotovoltaic power generating apparatus in accordance with a first embodiment of the invention. FIG. 2 is a schematic plan view with a partial sectional view of the thermophotovoltaic power generating apparatus. A fuel gas is introduced into a pre-mixing chamber 14 via a fuel pipe 12, and is mixed with air introduced via an air pipe described below. The mixed gas is supplied to an upper burner 18a via a mixed gas pipe 16a, and is also supplied to a lower burner 18b via a mixed gas pipe 16b.

The upper burner 18a and the lower burner 18b provided as a combustion gas supplier have a configuration in which a cylindrical pipe forms sides of a rectangle. The burners 18a, 18b have ejection apertures 20 that are formed at predetermined intervals for ejecting the mixed gas inwardly in horizontal directions. The mixed gas is ignited at the ejection apertures 20, and burns forming flames substantially in the horizontal directions.

An emitter 22 formed by a porous body is disposed between the upper burner 18a and the lower burner 18b. The emitter 22 has an internal hollow. The combustion gas produced by combustion of the fuel at the upper and lower surface sides of the emitter 22 flows through the porous emitter 22, and is let to the internal hollow portion of the emitter, and is discharged via an outlet 24.

The emitter 22 is heated by the high-temperature combustion gas passing therethrough, and radiates infrared light from its upper and lower surfaces. An upper filter 26a and a plurality of photoelectric conversion cells 28a are disposed outside the upper burner 18a. Likewise, a lower filter 26b and a plurality of photoelectric conversion cells 28b are disposed outside the lower burner 18b.

Radiated infrared light passes through the filters 26a, 26b, and strikes the photoelectric conversion cells 28a, 28b, and is thereby converted into electric power. The filters 26a, 26b transmit only a component of light that contributes to photoelectric conversion, and reflects a component that does not contribute to photoelectric conversion, so that the reflected component is used to heat the emitter 22.

Thus, in the flat-type thermophotovoltaic power generating apparatus of this embodiment, the infrared light radiated from the two surfaces of the emitter is received by the photoelectric conversion cells disposed on the two surfaces. Therefore, electric power generating efficiency improves.

An air pipe 30 for introducing air into the pre-mixing chamber 14 extends from the site of the outlet 24 to the pre-mixing chamber 14 through the internal hollow portion of the emitter 22. In the internal hollow portion of the emitter 22, the air pipe 30 meanders so as to maximize the area of indirect contact of the air inside the air pipe 30 with the combustion gas and therefore ensure sufficient heat exchange. The configuration of the air pipe 30 in the internal hollow portion is not particularly limited as long as sufficient heat exchange is allowed.

Due to the construction in which the air pipe 30 is disposed in the internal hollow portion of the emitter 22 through which the combustion gas flows after heating the emitter 22, the air needed for the combustion is pre-heated by residual heat of the combustion gas. Since the pre-heated air and the fuel burn, the temperature of the combustion gas increases, and the temperature of the emitter 22 correspondingly increases. As a result, the intensity of radiation from the emitter 22 increases. Thus, the electric power generated by the photoelectric conversion cells 28a, 28b increases.

Furthermore, since the air pipe 30 is disposed within the emitter, the entire apparatus is compact.

Figure 3:
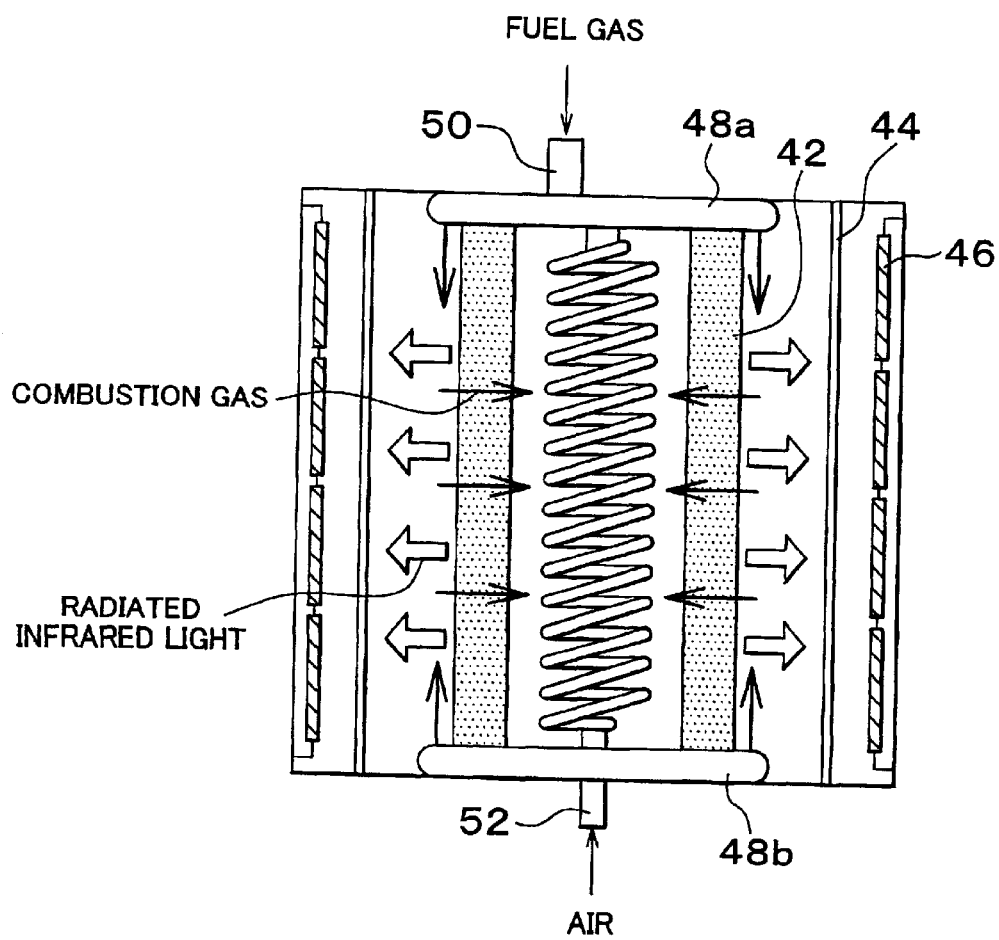
FIG. 3 is a schematic elevation with a partial sectional view of a thermophotovoltaic power generating apparatus in accordance with a second embodiment of the invention.
Figure 4:
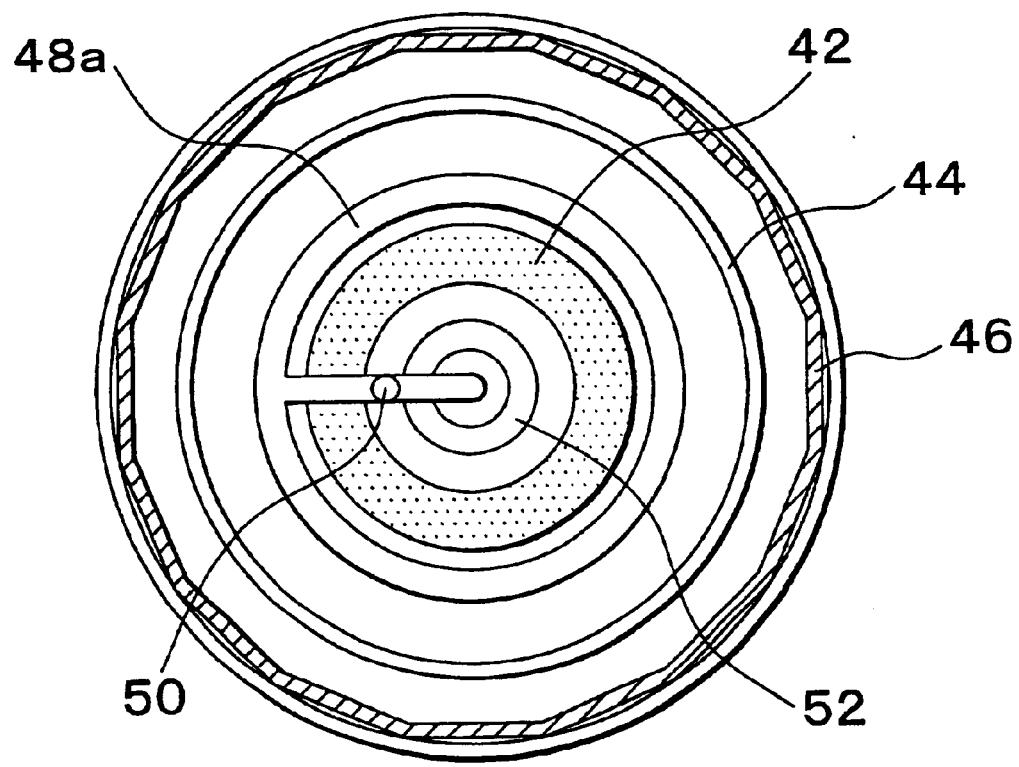
FIG. 4 is a schematic plan view with a partial sectional view of the thermophotovoltaic power generating apparatus in accordance with the second embodiment of the invention.

FIG. 3 is a schematic elevation with a partial sectional view of a thermophotovoltaic power generating apparatus in accordance with a second embodiment of the invention. FIG. 4 is a schematic plan view with a partial sectional view of the thermophotovoltaic power generating apparatus. The second embodiment relates to a cylindrical thermophotovoltaic power generating apparatus whereas the first embodiment relates to the flat thermophotovoltaic power generating apparatus.

In FIGS. 3 and 4, reference numeral 42 represents a porous emitter. A substantially cylindrically shaped filter 44 is provided outside the emitter 42. A plurality of photoelectric conversion elements (or photoelectric conversion cells) 46 are provided outside the filter 44, and together form a cylinder.

An upper burner 48a and a lower burner 48b have an annular shape. These burners are supplied with a mixed gas of a fuel gas from a fuel pipe 50 and air from an air pipe 52. The air pipe 52 extends in a substantially spiral configuration within an internal hollow portion of the cylindrical porous emitter 42.

The annular upper burner 48a has in its lower portion a plurality of ejection apertures that are formed at predetermined intervals for ejecting the mixed gas downward. Likewise, the annular lower burner 48b has in its upper portion a plurality of ejection apertures formed at predetermined intervals for ejecting the mixed gas upward. The mixed gas is ignited at the ejection apertures, and burns forming flames along surfaces of the emitter 42.

The combustion gas produced by the combustion is led through the cylindrical porous emitter 42 to its internal hollow portion, and is released upward. Residual heat of the combustion gas that has heated the emitter pre-heats air, as in the first embodiment. Infrared light radiated from the surface of the emitter 42 reaches the photoelectric conversion cells 46 through the filter 44, and is thereby converted into electric power.

Thus, the second embodiment also achieves substantially the same advantages as those achieved by the first embodiment. Unlike the flat thermophotovoltaic power generating apparatus, the cylindrical thermophotovoltaic power generating apparatus allows the quantity of light received per unit area by the photoelectric conversion cells to be adjusted by adjusting the distance between the cells and the emitter. Furthermore, the adoption of the cylindrical arrangement allows optimization of the quantity of light received per unit area by the photoelectric conversion cells.

As is apparent from the foregoing description, residual heat of the combustion engine having heated the emitter is effectively utilized to heat air needed for the combustion of fuel, and light radiated from the efficiently heated emitter is efficiently received by the photoelectric conversion elements, according to the invention. Therefore, the electric power generating efficiency considerably improves.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less, or only a single element, are also within the spirit and scope of the invention.

What is claimed is:

1. A thermophotovoltaic power generating apparatus comprising:
   an emitter formed by a porous body that is heated by a combustion gas produced by combustion of a fuel and air; and
   a photoelectric conversion element that receives light radiated from the emitter, and converts the light into electric power, wherein the emitter has an air passage for supplying said air that extends through an internal hollow portion of the emitter; and a combustion gas supplier disposed outside the emitter between the emitter and the photoelectric conversion element for supplying the combustion gas to the emitter, wherein the photoelectric conversion element is disposed outside the emitter, and wherein the combustion air is pre-heated by residual heat of the combustion gas.

2. A thermophotovoltaic power generating apparatus according to claim 1, wherein the air passage meanders within the emitter.

3. A thermophotovoltaic power generating apparatus according to claim 1, wherein the emitter has a generally rectangular parallelepiped shape having an internal hollow portion.

4. A thermophotovoltaic power generating apparatus according to claim 1, wherein the combustion gas supplier is disposed above and below the emitter.

5. A thermophotovoltaic power generating apparatus according to claim 4, wherein the photoelectric conversion element is disposed above the combustion gas supplier disposed above the emitter, and below the combustion gas supplier disposed below the emitter.

6. A thermophotovoltaic power generating apparatus according to claim 1, wherein the emitter has a cylindrical shape having an internal hollow portion.

7. A thermophotovoltaic power generating apparatus according to claim 6, wherein the air passage extends in a substantially spiral shape within the emitter.

8. A thermophotovoltaic power generating apparatus according to claim 6, wherein the photoelectric conversion element is disposed outside the emitter, and has a substantially cylindrical shape surrounding the emitter.

9. A power generating method of a thermophotovoltaic power generating apparatus in which an emitter is heated by a combustion gas produced by a fuel and air, and light radiated from the emitter is converted into electric power by a photoelectric conversion element, the method comprising:

leading the combustion gas that has heated the emitter to a vicinity of the air; the combustion gas being from a combustion gas supplier disposed outside the emitter between the emitter and the photoelectric conversion element;

pre-heating the air through heat exchange between the combustion gas and the air; and directing the light radiated from the emitter to the photoelectric conversion element, wherein the emitter is formed of a porous body and has an air passage extending through an internal hollow portion thereof, and the photoelectric conversion element is disposed outside the emitter.

10. A power generating method according to claim 9, wherein the heat exchange is enhanced by forming an air passage for leading the air in a meandering path.

11. A power generating method according to claim 9, wherein the heat exchange is enhanced by forming an air passage for leading the air in a substantially spiral shape.

12. A power generating method according to claim 9, wherein an outer surface of the emitter is surrounded by the photoelectric conversion element, and an amount of light received per a unit area by the photoelectric conversion element is adjusted by adjusting a distance between the photoelectric conversion element and the emitter.

13. A power generating method according to claim 12, wherein the amount of light received per the unit area by the photoelectric conversion element is optimized by forming the emitter in a substantially cylindrical shape and forming the photoelectric conversion element surrounding the outer surface of the emitter in a substantially cylindrical shape.

14. A method of generating power, comprising:

producing a combustion gas from a fuel and air and supplying the combustion gas from a combustion gas supplier;

heating an emitter with combustion gas, the emitter being formed by a porous body having an internal air passage for supplying said air therethrough, the combustion gas supplier being disposed outside the emitter;

emitting light from the heated emitter;

converting the light into electric power in a photoelectric conversion element disposed outside the emitter, wherein the combustion gas supplier is disposed between the emitter and the photoelectric element; and pre-heating additional air with the combustion gas.

15. The method of claim 14, wherein the step of pre-heating additional air further comprises forming an air passage in a meandering path.

16. The method of claim 14, wherein a path for the pre-heating of the additional air defines a substantially spiral shape.

17. The method of claim 14, further comprising:

surrounding an outer surface of the emitter with the photoelectric conversion element.

18. The method of claim 14, wherein the combustion gas is produced in the combustion gas supplier.

* * * * *